Patented Apr. 16, 1929.

1,709,256

UNITED STATES PATENT OFFICE.

ERICH FISCHER, OF HOCHST-ON-THE-MAIN, GERMANY, ASSIGNOR TO GRASSELLI DYE-STUFF CORPORATION, OF NEW YORK, N. Y., A CORPORATION OF DELAWARE.

DINITRO-HALOGENARYLS AND PROCESS FOR PREPARING SAME.

No Drawing. Application filed October 12, 1927, Serial No. 225,839, and in Germany October 18, 1926.

My present invention relates to new dinitro-halogen-aryls and a process for preparing same.

I have found that dinitrohalogen-aryls of the following constitution:

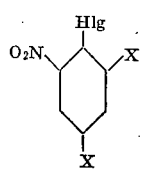

wherein X represents the groups:

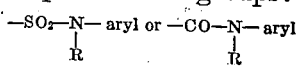

but one X a nitro group,

R standing for an alkyl, aryl or aralkyl residue are valuable intermediate products for the manufacture of dyestuffs or other products.

The new compounds in question are obtained by converting the halogen-dinitrobenzenesulfonic acids and halogen-dinitrobenzene carboxylic acids into the corresponding acid chlorides and condensing the latter with secondary aromatic amines. During these operations only the chlorine in the acid-chloride group enters into reaction whereas the halogen which is directly attached to the benzene ring remains unattacked. The condensation may be effected in the presence or absence of an indifferent solvent. In the latter case the condensation product may be obtained for instance by treating the two components in a ball mill in the presence of an acid binding agent. The procedure for preparing the new compound may also be modified in such a manner that for instance 4-chloro-3.5-dinitro-1-benzoic acid and monomethylaniline are dissolved in toluene and the condensation effected by adding for instance phosphorous pentachloride.

The following example serves to illustrate my invention but it is not intended to limit it thereto, all parts being parts by weight:

273 parts of the compound of the formula:

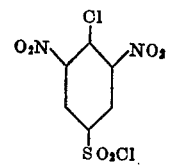

are treated with the addition of water or another indifferent diluent with 214 parts of monomethylaniline (2 molecules) at ordinary or raised temperature: when the reaction is complete, the excess of monomethylaniline is dissolved out and the product of the reaction, having the formula:

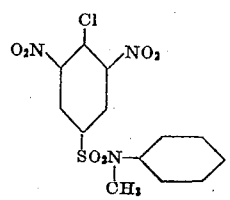

is recrystallized from toluene. It is a colorless body which melts at 161° C. (uncorrected). Instead of the monomethylaniline, which is used in excess in order to bind the acid, there may be employed another acid-binding agent, such, for instance, as chalk, sodium acetate or the like.

In a manner similar to that above described the following bodies can be prepared:

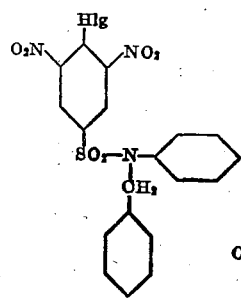
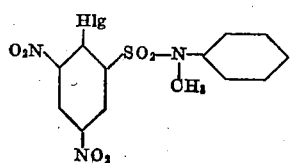
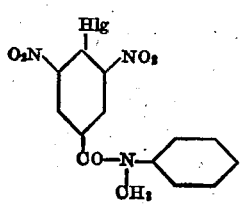
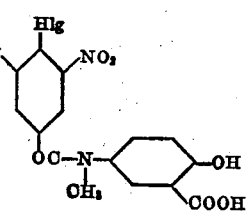

I claim:

1. The process which consists in causing a halogen-dinitrobenzene of the following formula:

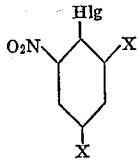

wherein X stands for SO$_2$-halogen or CO-halogen, but one X represents a nitro group and any secondary aromatic amine to act upon each other.

2. The process which consists in causing a halogendinitrobenzene of the following formula:

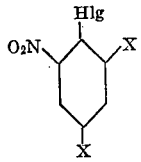

wherein X stands for SO$_2$-halogen or CO-halogen, but one X represents a nitro group and a secondary aromatic amine to act upon each other in the presence of an acid-binding agent.

3. The process which consists in causing a halogendinitrobenzene of the following formula:

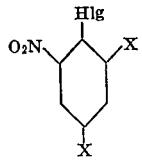

wherein X stands for SO$_2$-halogen or CO-halogen, but one X represents a nitro group and monomethylaniline to act upon each other.

4. The process which consists in causing a halogen-dinitrobenzene of the formula:

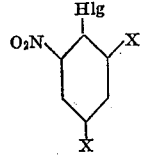

wherein X stands for SO$_2$-halogen or CO-halogen, but one X represents a nitro group and monomethylaniline to act upon each other in the presence of an acid-binding agent.

5. The process which consists in causing halogen-dinitrobenzene of the following formula:

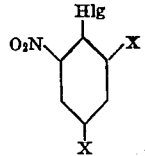

wherein X stands for SO$_2$-halogen or CO-halogen, but one X represents a nitro group and an excess of monomethylaniline to act upon each other.

6. The process which consists in causing a halogen-dinitrobenzene of the following formula:

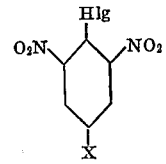

wherein X stands for SO$_2$-halogen or CO-halogen and any secondary aromatic amine to act upon each other.

7. The process which consists in causing a halogen-dinitrobenzene of the following formula:

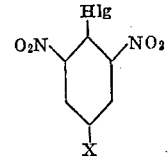

wherein X stands for SO$_2$-halogen or CO-halogen and any secondary aromatic amine to act upon each other in the presence of an acid-binding agent.

8. The process which consists in causing a halogen-dinitrobenzene of the following formula:

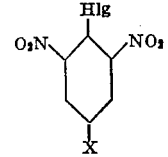

wherein X stands for SO$_2$-halogen or CO-halogen and monomethylaniline to act upon each other.

9. The process which consists in causing a halogen-dinitrobenzene of the following formula:

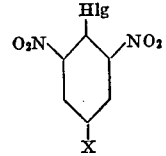

wherein X stands for SO$_2$-halogen or CO-halogen and monomethylaniline to act upon each other in the presence of an acid-binding agent.

10. The process which consists in causing a halogen-dinitrobenzene of the following formula:

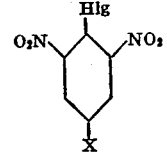

wherein X stands for SO$_2$-halogen or CO-halogen and an excess of monomethylaniline to act upon each other.

11. The process which consists in causing a halogen-dinitrobenzene of the following formula:

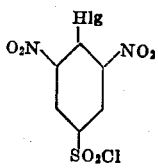

and any secondary aromatic amine to act upon each other.

12. The process which consists in causing a halogen-dinitrobenzene of the formula:

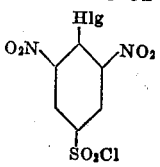

and any secondary aromatic amine to act upon each other in the presence of an acid-binding agent.

13. The process which consists in causing a halogen-dinitrobenzene of the following formula:

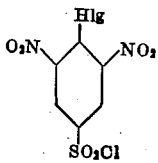

and monomethylaniline to act upon each other.

14. The process which consists in causing a halogen-dinitrobenzene of the formula:

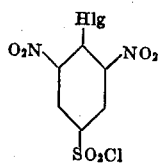

an monomethylaniline to act upon each other in the presence of an acid-binding agent.

15. The process which consists in causing a halogen-dinitrobenzene of the formula:

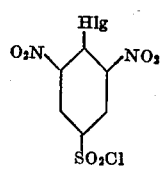

and an excess of monomethylaniline to act upon each other.

16. The process for preparing a halogen-dinitrobenzene of the following formula:

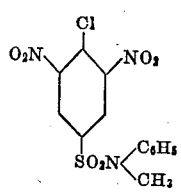

which consists in causing chloro-dinitrobenzenesulfonic acid chloride of the following formula:

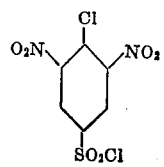

and an excess of monomethylaniline to act upon each other in the presence of water.

17. As new products, halogen-dinitroaryls of the following formula:

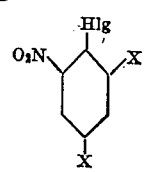

wherein X stands for a

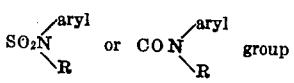

(R representing alkyl, aralkyl, aryl), but one X stands for a nitro group said products being white crystalline bodies and being valuable intermediate products for the manufacture of dyestuffs and other products.

18. As new products, halogen-dinitroaryls of the following formula:

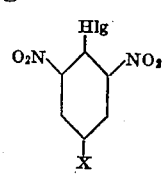

wherein X stands for a

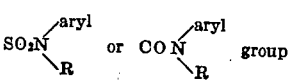

(R representing alkyl, aralkyl, aryl), said products being white crystalline bodies and being valuable intermediate products for the manufacture of dyestuffs and other products.

19. As new products, halogen-dinitroaryls of the formula:

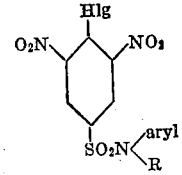

wherein R stands for alkyl, aralkyl, aryl said products being white crystalline bodies and being valuable intermediate products for the manufacture of dyestuffs and other products.

20. As a new product, the compound of the following formula:

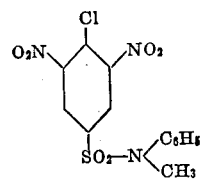

said product being recrystallizable from toluene and forming a colorless body, melting at about 161° C. uncorrected.

In testimony whereof, I affix my signature.

ERICH FISCHER.